United States Patent
Boyd et al.

(10) Patent No.: US 7,024,584 B2
(45) Date of Patent: Apr. 4, 2006

(54) METHOD, SYSTEM, AND ARTICLE OF MANUFACTURE FOR MAINTAINING DATA INTEGRITY

(75) Inventors: Kenneth Wayne Boyd, Tucson, AZ (US); Kenneth Fairclough Day III, Tucson, AZ (US); Philip Matthew Dudas, Tucson, AZ (US); William Frank Micka, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/340,354

(22) Filed: Jan. 9, 2003

(65) Prior Publication Data

US 2004/0139367 A1 Jul. 15, 2004

(51) Int. Cl.
*G06F 11/00* (2006.01)
(52) U.S. Cl. ............................ 714/6; 707/202; 711/163
(58) Field of Classification Search .................... 714/6
See application file for complete search history.

(56) References Cited

U.S. PATENT DOCUMENTS

| | | | |
|---|---|---|---|
| 5,504,861 A | 4/1996 | Crockett et al. | |
| 5,615,329 A | 3/1997 | Kern et al. | |
| 6,539,462 B1 * | 3/2003 | Mikkelsen et al. | 711/162 |
| 6,799,189 B1 * | 9/2004 | Huxoll | 707/204 |
| 2003/0221075 A1 * | 11/2003 | Achiwa et al. | 711/162 |
| 2004/0093361 A1 * | 5/2004 | Therrien et al. | 707/204 |

OTHER PUBLICATIONS

Mills, David L. "RFC 1305- Network Time Protocol (Version 3) Specification, Implementation and Analysis". [online], Mar. 1992, [Retrieved on Jun. 28, 2002]. Retrieved from the Internet at <URL: http://www.faqs.org/rfcs/rfc1305.html>.

* cited by examiner

*Primary Examiner*—Scott Baderman
*Assistant Examiner*—Brian Assessor
(74) *Attorney, Agent, or Firm*—Janaki K. Davda; Konrad Raynes & Victor LLP (57) ABSTRACT

Disclosed is a system, method, and article of manufacture for maintaining data integrity. A frequency for creating consistent transactions sets is negotiated. A consistent transactions set creation duration is negotiated. At an interval determined by the frequency, during the consistent transactions set creation duration, processing of a first consistent transactions set is completed, while processing of a second consistent transactions set is delayed until the end of the consistent transactions set creation duration. After the first consistent transactions set have been offloaded to secondary storage, consistent copies of data may be created.

58 Claims, 9 Drawing Sheets

METHOD, SYSTEM, AND ARTICLE OF MANUFACTURE FOR MAINTAINING DATA INTEGRITY

CROSS-REFERENCE TO RELATED APPLICATIONS

This application is related to commonly owned and co-pending application Ser. No. 10/339,957 entitled "Method, System, and Article of Manufacture for Creating a Consistent Copy," by K. W. Boyd, et al., Docket No. TUC920020032US1, filed on the same date herewith, and which is incorporated by reference herein in its entirety.

BACKGROUND OF THE INVENTION

1. Field of the Invention

The present invention is directed to maintaining data integrity between a primary site and a secondary site.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary storage device, extended remote copy (XRC®) and peer-to-peer remote copy (PPRC®).

These systems provide a method for recovering data updates between a last, safe backup and a system failure. Such data shadowing systems can also provide an additional remote copy for non-recovery purposes, such as local access at a remote site. The IBM XRC® and PPRC® systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the IBM XRC® environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volumes in the volume pair in the same order as they were done on the primary volume. In the XRC® and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. For instance, in the banking example, in order to maintain consistency, the withdrawal transaction needs to be in the same consistent transactions set as the deposit or in a later consistent transactions set; the withdrawal cannot be in an earlier consistent transactions set. Consistency groups maintain data consistency across volumes. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC® environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Oftentimes, when a first consistency group is created, a first computer in a cluster of computers sends messages to the other computers in the cluster to complete processing the first consistency group. Upon completion of processing of the first consistency group, the computers send messages to the first computer to indicate that they have completed. The first computer may perform some processing (e.g., creating a copy of data that includes the first consistency group). Then, the first computer sends messages to the other computers to indicate that they should process a second consistency group. There is a need in the art to eliminate the use of these messages for more efficient maintenance of data integrity between the primary storage device and the secondary storage device.

SUMMARY OF THE INVENTION

Provided are a method, system, and article of manufacture for maintaining data integrity. A frequency for creating consistent transactions sets is negotiated. A consistent transactions set creation duration is negotiated. At an interval determined by the frequency, during the consistent transactions set creation duration, processing of a first consistent transactions set is completed, while processing of a second consistent transactions set is delayed until the end of the consistent transactions set creation duration.

In additional implementations, completing processing of a first consistent transactions set comprises caching the first consistent transactions set. Then, the cached first consistent transactions set is forwarded to a secondary storage device. A consistent copy is created at the secondary storage device once the cached consistent transactions set has been offloaded.

In certain implementations, the frequency is set by a user, while in certain other implementations, the frequency is set by an administrator.

In further implementations, the consistent transactions set creation duration is a function of jitter time. In yet further implementations, jitter time comprises a time delay among a cluster of time synchronized components.

In additional implementations, selection of a backup captain in a cluster of components is negotiated.

In certain implementations, a message is sent from a backup component to a backup captain to acknowledge transition from the first consistent transactions set to the second consistent transactions set.

In further implementations, after all backup components have offloaded the first consistent transactions set to one or more secondary storage devices, consistent copies of data are created at the one or more secondary storage devices, wherein each consistent copy is consistent for a consistent transactions set. In additional implementations, a backup captain receives notifications from each backup component that the backup component has offloaded the first consistent transactions set and initiates creation of the one or more consistent copies. In yet further implementations, the backup captain transmits a notification to each backup component to indicate that the backup component may offload the second consistent transactions set.

In certain implementations, after the consistent transactions set creation duration, the second consistent transactions set is processed.

In additional implementations, it is determined whether all backup components have completed processing the first consistent transactions set and are ready to process the second consistent transactions set. If not all of the backup components have completed processing the first consistent transactions set and are ready to process the second consistent transactions set, a message is sent from a backup captain to each of the backup components identifying an error recovery technique to be performed by each of the backup components.

In further implementations, a message is sent to each backup component from a backup captain to indicate that the backup captain is functioning.

The described implementations of the invention provide a method, system, and article of manufacture for maintaining data integrity across different storage devices. Implementations of the invention are particularly useful for mass storage spaces comprised of volumes spread across numerous storage systems. With implementations of the invention, backup components create consistent transaction sets autonomously.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Data integrity is maintained between a primary site and a secondary site. The primary site includes primary storage devices, such as a set of DASD or other storage media that store data that may be accessed by multiple users. The secondary site includes secondary storage devices, such as a set of DASD or other storage media that store data used to recover data at the primary site when the primary site requires disaster recovery. A cluster of backup components reside between the primary site and the secondary site. Each backup component in the cluster of components can communicate with each other backup component in the cluster. Backup components, such as personal computers, receive or intercept messages for backing up data ("backup messages") from the primary site and route the backup messages to the secondary site.

In accordance with certain implementations of the invention, a first copy of data at each of the secondary storage devices is updated constantly and is not necessarily consistent with data at the primary site at any given time. The first copy of the data is also referred to herein as "secondary data." Additionally, a second copy of data is maintained at the secondary storage devices. The second copy is a copy of the first copy taken when the first copy at the secondary site is consistent with a set of transactions applied at the primary site at some point in time. The second copy, which is also referred to herein as a "consistent copy," may be used for disaster recovery at a recovery site (e.g., a remote site). In addition, if the primary site loses data due to a disaster, the data at the primary site may be restored using a corresponding consistent copy.

A consistent copy is one that incorporates updates from a consistent transactions set. Creation of a consistent copy is further described in the cross-referenced application entitled "Method, System, and Article of Manufacture for Creating A Consistent Copy," which is incorporated by reference herein in its entirety.

One of the backup components is referred to herein as a "backup captain," and the remaining backup components are referred to herein as "backup members." The backup components receive backup messages from the primary site describing transactions (e.g., pending I/O requests). Transactions received from the primary site at the backup components are referred to as "inbound transactions." The backup components associate these inbound transactions with an identifier such that all transactions associated with a certain identifier comprise all of the activity on the consistency group for a certain period of time and all transactions associated with the identifier form a consistent transactions set. Periodically the backup components pause (i.e., stop receiving inbound transactions temporarily) at which time consistent transactions sets are created. It is this pause across all backup components that ensures point-in-time consistency. That is, at a point in time, if all transactions of a consistent transactions set were applied to the secondary volumes, the secondary volumes would be exact copies of the corresponding primary volumes at the time the transactions in the consistent transactions set were applied at the corresponding primary volumes.

Simultaneously, the backup components may be sending previously cached transactions to the secondary storage devices. Transactions sent from caches at the backup components to the secondary site are referred to as "outbound transactions." A consistent transactions set in a cache includes one or more outbound transactions. There may be one or more consistent transactions sets in cache, waiting to be sent to secondary storage, at a given point. The backup components send all outbound transactions from the current consistent transactions set (i.e., a current outbound consistent transactions set) that is to be sent to secondary storage, temporarily stop sending outbound transactions, and notify the backup captain that they have completed sending the current outbound consistent transactions set. When all backup components have completed sending the current outbound consistent transactions set, the backup captain causes consistent copies to be made of the now consistent secondary volumes. At this time, the consistent copies are a reflection of the exact state of the primary volumes at the time the current outbound consistent transactions set was formed. Once the consistent copies have been made, the backup captain notifies (e.g., sends a message to) the backup components to send the next outbound consistent transactions set from cache to secondary storage.

When creating consistent transactions sets to ensure data integrity at the secondary data site, the cluster of backup components synchronize the data they receive from the primary data storage devices and the order in which they transfer it to the secondary data storage devices to create a usable consistent copy. For efficiency, the backup components may receive data from multiple primary data storage devices at the primary site on multiple physical data paths. In certain implementations, data from primary storage devices are transferred to secondary storage devices at the secondary site in the order in which they were received. In certain implementations, data need not be transferred in the order which they were received. Therefore, all backup components periodically transfer all data of a consistent transactions set to the secondary data storage devices to provide point-in-time consistency for data recovery in case of a catastrophic data loss at the primary site.

In order to synchronize the point-in-time that the backup components transfer the consistent transactions set to the secondary data storage devices while not disrupting the data stream from the primary data storage devices, a low-overhead, non-disruptive technique is provided to ensure all backup components are synchronized as to the time they determine their consistent transactions sets.

Figure 1A:
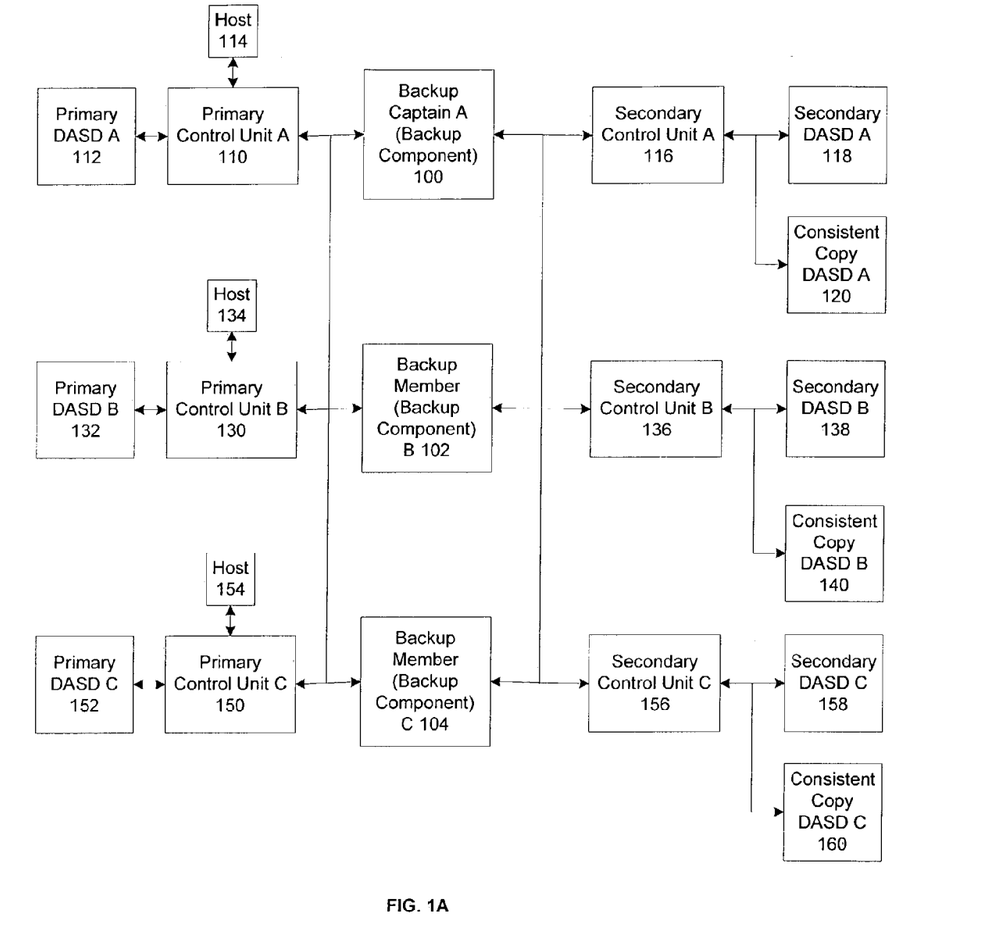
FIG. 1A illustrates, in a block diagram, a computing environment in accordance with some implementations of the invention.

FIG. 1A illustrates, in a block diagram, a computing environment in accordance with some implementations of the invention. Primary control units A 110, B 130, and C 150 provide one or more host computers 114, 134, or 154, respectively, access to primary DASD A 112, B 132, and C 152, respectively. The primary control units A 110, B 130, and C 150 may also have primary caches (not shown) in which updates to tracks in the primary DASD A 112, B 132, and C 152, respectively, are maintained until destaged to primary DASD A 112, B 132, and C 152. Back-up copies of all or a subset of the volumes of the primary DASD A 112, B 132, and C 152 may be maintained at secondary DASD A 118, B 138, and C 158.

A primary site may include primary control units A 110, B 130, and C 150, primary DASD A 112, B 132, and C 152, and host computers 114, 134, and 154. A secondary site may include secondary control units A 116, B 136, and C 156, secondary DASD A 118, B 138, and C 158, and consistent copy DASD A 120, B 140, and C 160.

In some implementations, a "volume pair" comprises a volume in the primary DASD and the shadow of that volume in the secondary DASD that maintains a back-up copy of the data at the primary volume in the volume pair. Certain implementations, for each primary volume, there is a corresponding secondary volume with consistent contents; this is a volume pair. For example, updates to the primary DASD A 112 are transferred to the secondary control unit A 116 for storage in the secondary DASD A 118.

The primary control units A 110, B 130, and C 150 may further include a non-volatile storage unit (not shown), such as a battery-backed up volatile memory, to maintain a non-volatile copy of data updates. The primary control units A 110, B 130, and C 150 and secondary control units A 116, B 136, and C 156 may be comprised of the IBM 3990, Model 6 Storage Controller, Enterprise Storage Server, or any other control unit known in the art.

Backup components A 100, B 102, and C 104 transfer updates made to primary DASD A 112, B 132, and C 152 to secondary control units A 116, B 136, and C 156. One of the backup components is referred to as a backup captain A 100, while the remaining backup components are referred to as backup members B 102 and C 104. In some implementations, an administrator identifies one of the backup components A 100, B 102, and C 104 as a backup captain. Each backup component A 100, B 102, and C 104 may include a computer program for transferring backup messages from the primary control units A 110, B 130, and C 150 to the secondary control units A 116, B 136, and C 156. For example, the computer program for transferring the backup messages may be a system data mover (SDM) program, such as the SDM program included in the IBM XRC® system, that is in communication with the primary control units A 110, B 130, and C 150 and secondary A 116, B 136, and C 156 control units, and manages the transfer of updates to the secondary DASD A 118, B 138, and C 158. Thus, data is transferred between the primary A 110, B 130, and C 150 and secondary A 116, B 136, and C 156 control units via the backup components A 100, B 102, and C 104.

Each backup component A 100, B 102, and C 104 may transfer backup messages from any primary control unit A 110, B 130, and C 150. Each volume from each primary DASD corresponds to a volume on a secondary DASD. For example, a first volume on primary DASD A 112 is backed up to a volume on secondary DASD B 138, and a second volume on primary DASD A 112 is backed up to a volume on secondary DASD C 158. In certain implementations, one or more volumes are not backed up.

For example, backup component A 100 receives backup messages from the primary control unit A 110 indicating updates that should be sent to secondary control unit A 116 for application to secondary DASD A 118, which stores secondary data (i.e., data that is constantly updated). Alternatively, backup component A 100, B 102, and C 104 may intercept updates to primary DASD A 112, B 132, and C 152 for transfer to secondary control units A 116, B 136, and C 156.

Primary DASD A 112, B, 132, and C 152 and secondary DASD A 118, B 138, and C 158 contain volumes. In certain implementations, one backup component A 100, B 102, or C 104 processes backup messages for one volume. For example, primary DASD A 112 may include Volume1 and Volume2. Backup component B 102 may process all backup messages with update information for Volume1, while backup component C 104 may process all backup messages with update information for Volume 2. Volume1 and Volume2 on primary DASD A 112 correspond to volumes on secondary DASD A 118.

In certain implementations, the backup components A 100, B 102, and C 104, the primary control units A 110, B 130, C 150, and secondary control units A 116, B 136, and C 156 communicate via communication paths, such as direct high speed transmission lines (e.g., an Enterprise System Connection (ESCON®) link). However, the communication paths may be comprised of any other communication means known in the art, including network transmission lines, fiber optic cables, etc.

Figure 1B:
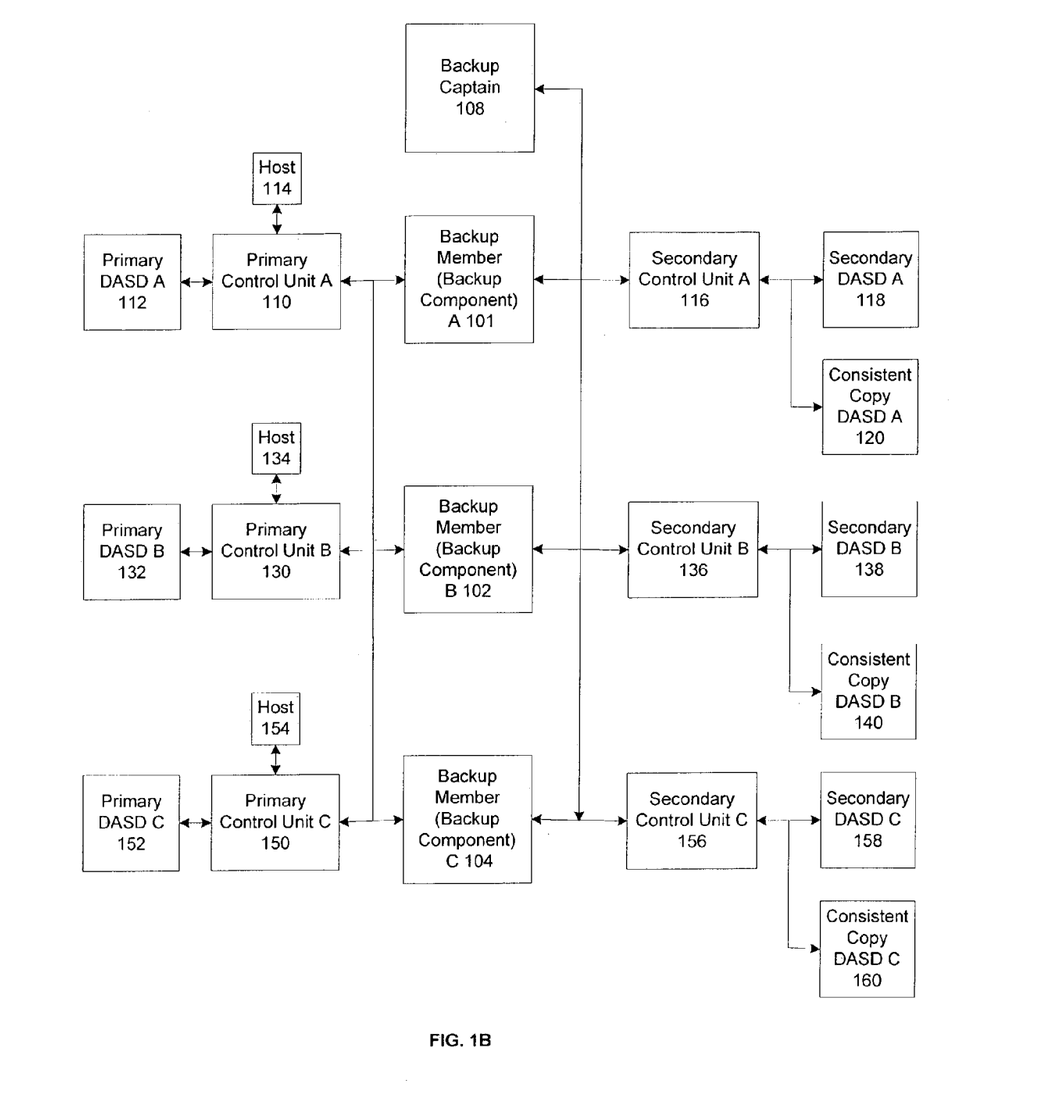
FIG. 1B illustrates, in a block diagram, a computing environment in accordance with alternative implementations of the invention.

FIG. 1B illustrates, in a block diagram, a computing environment in accordance with alternative implementations of the invention. In particular, a separate backup component may be designated a backup captain 108, while the remaining backup components may be designated backup members A 101, B 102, and C 104. Unlike the implementations illustrated in FIG. 1A, the backup captain 108 does not process backup messages between a primary and secondary control unit.

Figure 1C:
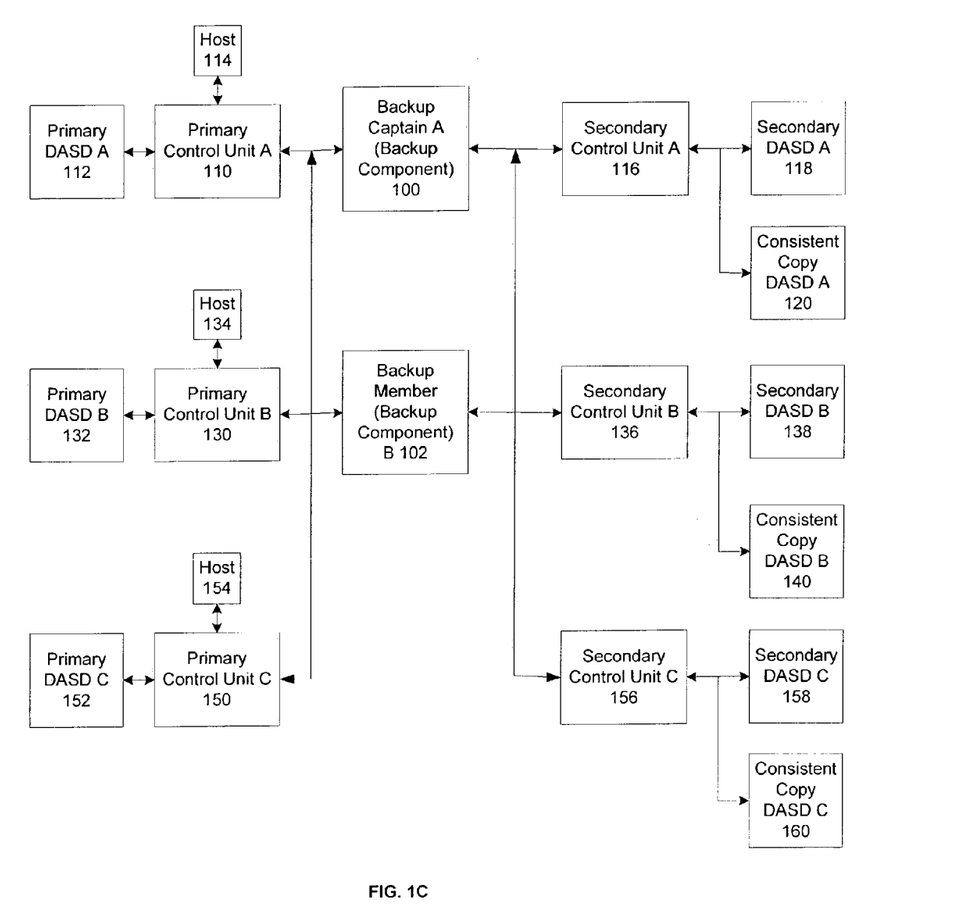
FIG. 1C illustrates, in a block diagram, a computing environment in accordance with alternative implementations of the invention.

FIG. 1C illustrates, in a block diagram, a computing environment in accordance with alternative implementations of the invention. In particular, there may be fewer backup components A 100 and B 102 than there are primary control units A 110, B 130, and C 150. Each primary control unit A 110, B 130, or C 150 may be linked to one or more backup components A 100 or B 102.

With implementations of the invention, backup components A 100, B 102, and C 104 process (e.g., cache) a first set of transactions associated with a first identifier. When the backup components A 100, B 102, and C 104 cache the first set of transactions, each backup component A 100, B 102, and C 104 transitions to processing a second set of transactions associated with a second identifier and notifies the backup captain A 100 of the transition. The backup components A 100, B 102, and C 104 may store sets of transactions, with each set associated with a different identifier.

Moreover, as the backup components A 100, B 102, and C 104 transfer transactions from the cache to secondary control units A 116, B 136, and C 156, the backup components A 100, B 102, and C 104 also receive additional transactions from primary control units A 110, B 130, and C 150. When each backup component A 100, B 102, and C 104 has transferred the cached set of transactions associated with a first identifier, each backup component A 100, B 102, and C 104 notifies the backup captain that it has transferred the cached set of transactions and will not transfer additional transactions until notified to do so by the backup captain A 100. When the backup components A 100, B 102, and C 104 are not transferring cached transactions to secondary control units A 116, B 136, and C 156, they are said to be "frozen". When the backup components A 100, B 102, and C 104 are "frozen," the backup captain A 100 notifies the secondary control units A 116, B 136, and C 156 to create consistent copies A 120, B 140, and C 160 based on secondary data A 118, B 138, and C 158. Then, the backup captain A 100 notifies the backup components A 100, B 102, and C 104 that they may transfer additional cached transactions.

Figure 2:
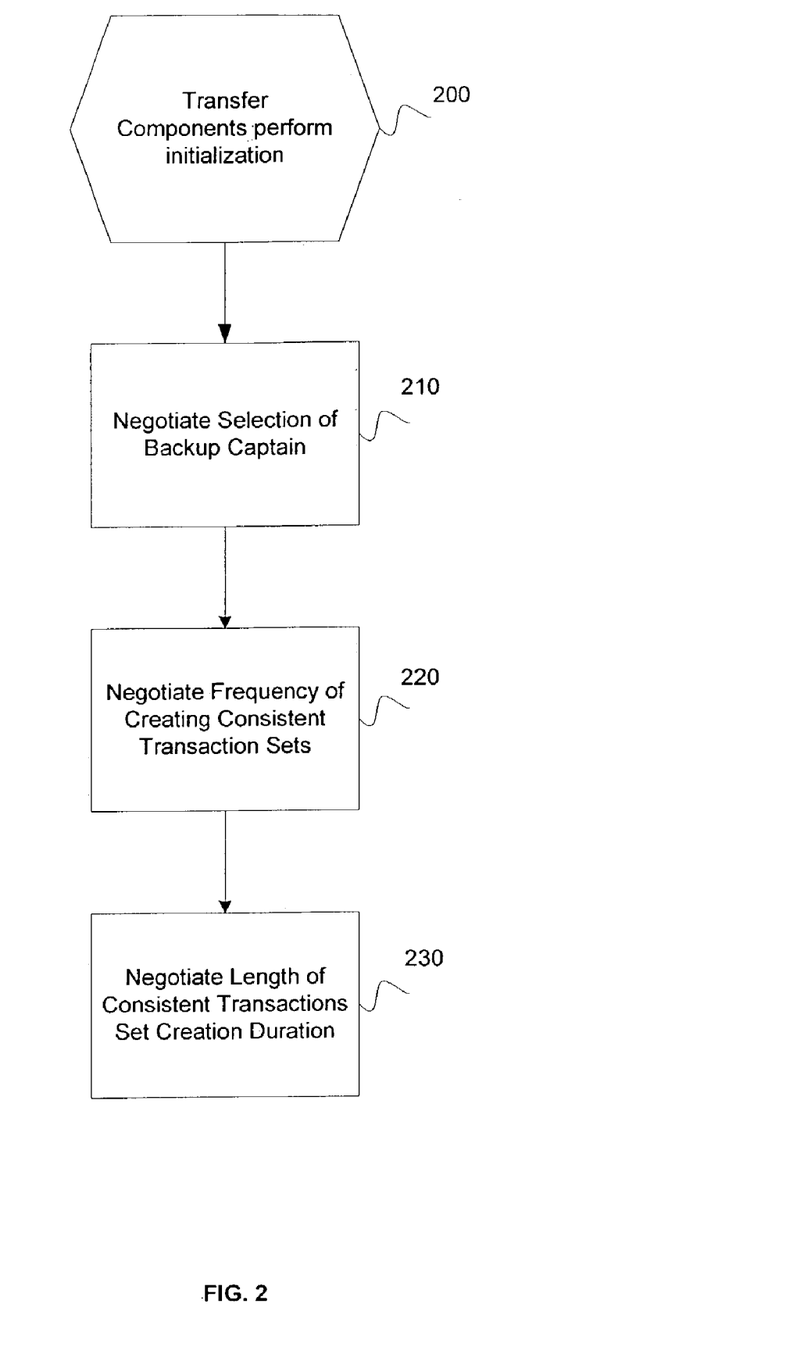
FIG. 2 illustrates logic implemented in the backup components during initialization in accordance with some implementations.

FIG. 2 illustrates logic implemented in the backup components A 100, B 102, and C 104 during initialization in accordance with some implementations. Control begins at block 200 with the backup components A 100, B 102, and C 104 performing initialization. During initialization, the backup components A 100, B 102, and C 104 negotiate selection of a backup captain (block 210). In certain implementations, the selection of a backup captain is determined with the backup components A 100, B 102, and C 104 determining which one of the backup components A 100, B 102 or C 104 has a lowest identification number (e.g., a machine serial number or other number may be used), and the backup component A 100, B 102 or C 104 with the lowest number is selected as the backup captain. Alternatively, the backup component A 100, B 102 or C 104 with the highest number, middle number, or other position in a range (e.g., from lowest to highest) may be selected as the backup captain.

The backup components A 100, B 102, and C 104 also negotiate the frequency of creating consistent transactions sets (block 220). A consistent transactions set is a set of transactions associated with a common identifier. In certain implementations, the frequency of creating consistent transactions sets may be negotiated among the backup components A 100, B 102, and C 104 by allowing the backup captain to select the frequency. The frequency of the consistent transactions set creation time may be set for timed intervals (e.g., every hour, every day, or every month).

In particular, each backup component A 100, B 102, and C 104 creates a consistent transactions set at the negotiated frequency. Thus, it may be said that negotiation of the frequency enables autonomic creation of consistent transactions sets at multiple backup components A 100, B 102, and C 104.

Moreover, the backup components A 100, B 102, and C 104 negotiate a length of a consistent transactions set creation duration (block 230). The consistent transactions set creation duration is a period of time during which the backup components assign an identifier to a set of transactions and cache the set of transactions. Once the set of cached transactions is forwarded from the backup components A 100, B 102, and C 104 to secondary control units A 116, B 136, and C 156, a consistent copy may be created at the secondary storage devices by copying secondary data in secondary DASD A 118, B 128, and C 138 to consistent copy DASD A 120, DASD B 140, and C DASD 160, respectively.

The consistent transactions set creation duration is a function of the collective "jitter time" for the backup components' A 100, B 102, and C 104 internal clocks. The term "jitter time" refers to a time-based error caused by time delays in circuits. In certain implementations, each backup components' A 100, B 102, and C 104 internal clock may not stay synchronized with the other backup components' A 100, B 102, and C 104 internal clocks due to variations in each internal clock. Thus, jitter time is a measure of synchronization error and internal oscillator drift among the backup components A 100, B 102, and C 104.

In certain implementations, the backup components' A 100, B 102, and C 104 internal clocks are synchronized using a technique, such as Network Time Protocol. Network Time Protocol provides a mechanism to synchronize time across networked computers. For more information, on Network Time Protocol Version 3, see Network Working Group, Request for Comments 1305, which is incorporated by reference herein in its entirety. Use of the Network Time Protocol technique or other time synchronization technique (e.g., a global positioning system (GPS) receiver or sysplex timer) minimizes the collective jitter time of all of the backup components, but does not necessarily eliminate jitter time.

To create consistent copies, each backup component A 100, B 102, and C 104 should stop processing transactions at the same point in time. That is, the first backup component to stop processing transactions and the last backup component to stop processing transactions should be stopped at the same time. Thus, the backup components' A 100, B 102, and C 104 internal clocks are synchronized to a common time within a jitter time. In certain implementations, the jitter time is in the 10's to 100's of nanoseconds. In certain implementations, the consistent transactions set creation duration is set to 2–3 times the determined jitter time.

Figure 3A:
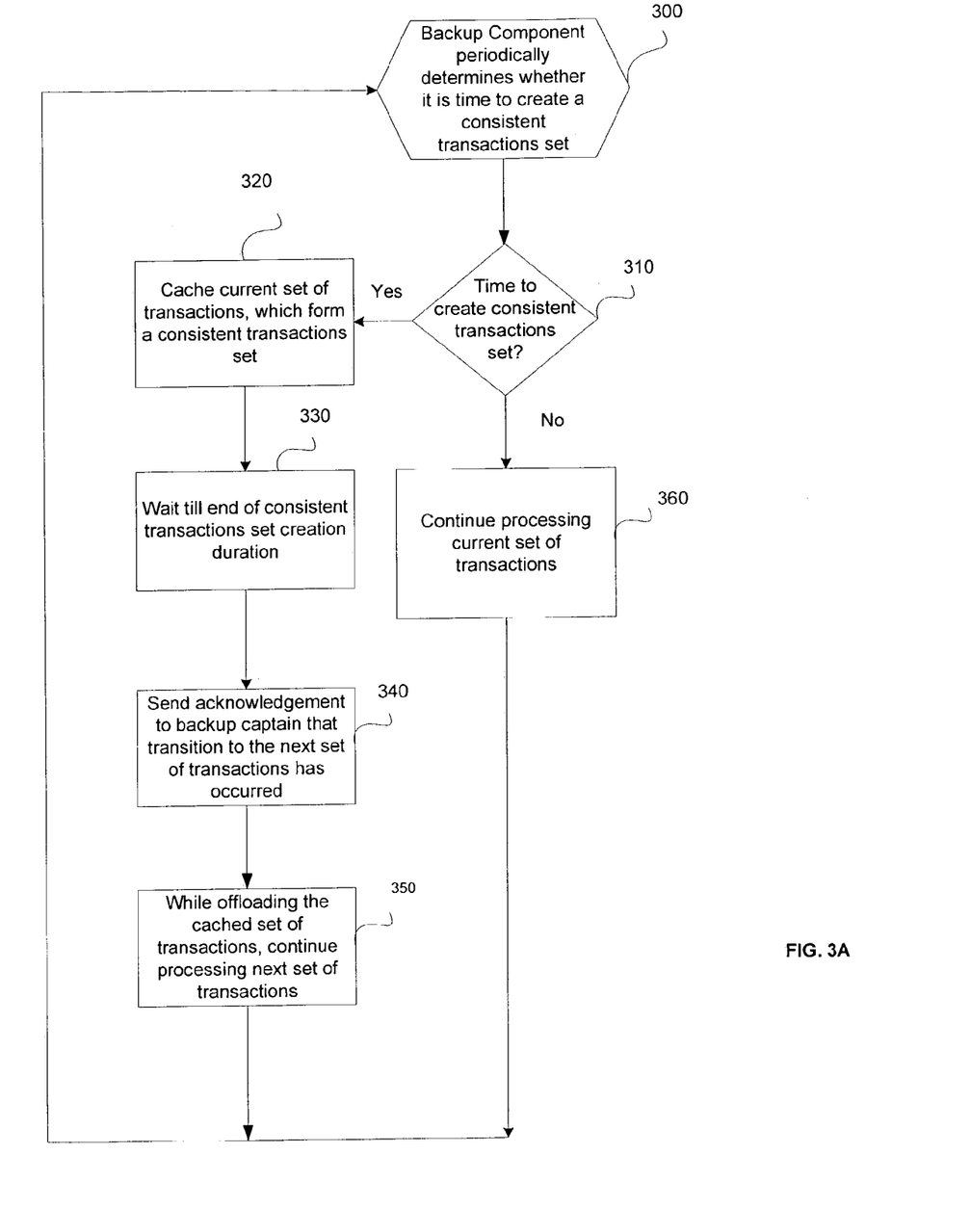
FIGS. 3A and 3B illustrate logic implemented in the backup components after initialization in accordance with some implementations.
Figure 3B:
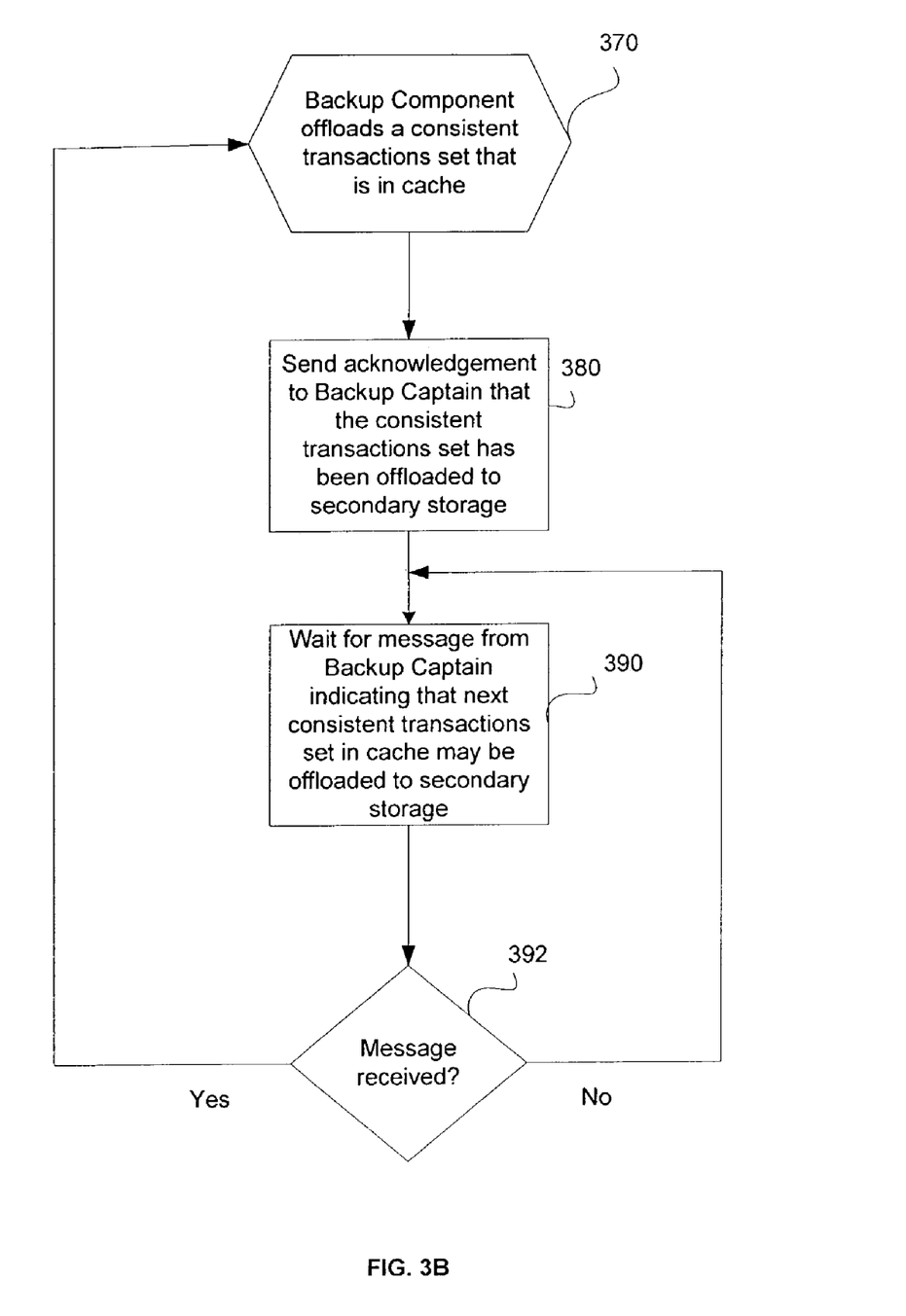

FIGS. 3A and 3B illustrate logic implemented in the backup components after initialization in accordance with some implementations. In FIG. 3A, control begins at block 300 with each backup component A 100, B 102, and C 104 periodically determining whether it is time to create a consistent transactions set. That is, at each predetermined consistent transactions set creation time, each backup component A 100, B 102, and C 104 completes processing (e.g., caching) a current set of transactions. Sets of transactions form consistent transactions sets, and multiple consistent transactions sets may be formed at a given point. In certain implementations, at the end of the consistent transactions set creation duration, each backup component A 100, B 102, and C 104 continues to process transactions. In certain implementations, each backup component A 100, B 102, and C 104 continues to process transactions once a consistent transactions set has been cached.

If it is time to create a consistent transactions set (block 310), processing continues to block 320, otherwise, processing continues to block 360. In block 320, each backup component A 100, B 102, and C 104 caches a current set of transactions, which form a consistent transactions set. In certain implementations, each backup component A 100, B 102, and C 104 waits until the end of the consistent transactions set creation duration (block 330). At the end of this consistent transactions set creation duration, each backup component A 100, B 102, and C 104 sends a message to the backup captain A 100 acknowledging that the backup component has cached the current set of transactions and has transitioned to processing a new set of transactions (block 340). While offloading the cached set of transactions to secondary control units 116, 136, and 156, each backup component A 100, B 102, and C 104 processes the next set of transactions (i.e., those in the next consistent transactions set) (block 350). That is, the backup components A 100, B 102, and C 104 return to processing backup messages from the primary control units A 110, B 130, and C 150. If it is not time to create a consistent transactions set, each backup component A 100, B 102, and C 104 continues processing the current set of transactions (block 360).

Although each backup component A 100, B 102, and C 104 is shown as sending a message to the backup captain A 100 after the consistent transactions set creation duration, the message may be sent during the consistent transactions set creation duration, for example, after the first set of transactions have been processed.

Although the description herein describes each backup component A 100, B 102, and C 104 sending an acknowledgment to the backup captain A 100, backup component A 100 may not send the backup captain A 100 (i.e., itself) an acknowledgment in some implementations as the backup captain A 100 may have an alternative technique for determining that it has processed the current set of transactions and is ready to process a new set of transactions.

The backup captain A 100 is responsible for monitoring all backup components A 100, B 102, and C 104 to ensure that each backup component A 100, B 102, and C 104 completes processing every consistent transactions set within a reasonable amount of time taking into account the clock jitter among backup components A 100, B 102, and C 104. If one or more backup components A 100, B 102, and C 104 do not transition to processing the next set of transactions properly, the backup captain A 100 performs error recovery before the next interval for creating a consistent transactions set.

In FIG. 3B, control begins at block 370 with each backup component A 100, B 102, and C 104 offloading a consistent transactions set that has been cached in a cache. In block 380, each backup component A 100, B 102, and C 104 sends an acknowledgment to the backup captain A 100 that the consistent transactions set that the backup component has in cache has been offloaded to secondary storage. Each backup component A 100, B 102, and C 104 may perform the offloading while also performing other processing (e.g., caching another set of transactions). Also, each backup component A 100, B 102, and C 104 may perform the offloading and send the notification at different times (i.e., the backup components A 100, B 102, and C 104 do not necessarily perform the offloading and sending of notifications simultaneously). In block 390, each backup component A 100, B 102, and C 104 waits for a message from the backup captain A 100 indicating that the next consistent transactions set may be offloaded to secondary storage. In block 392, each backup component A 100, B 102, and C 104 determines whether the message has been received. If so, processing continues to block 370 to offload another consistent transactions set. Otherwise, processing continues to block 390 to wait for the message.

Figure 4A:
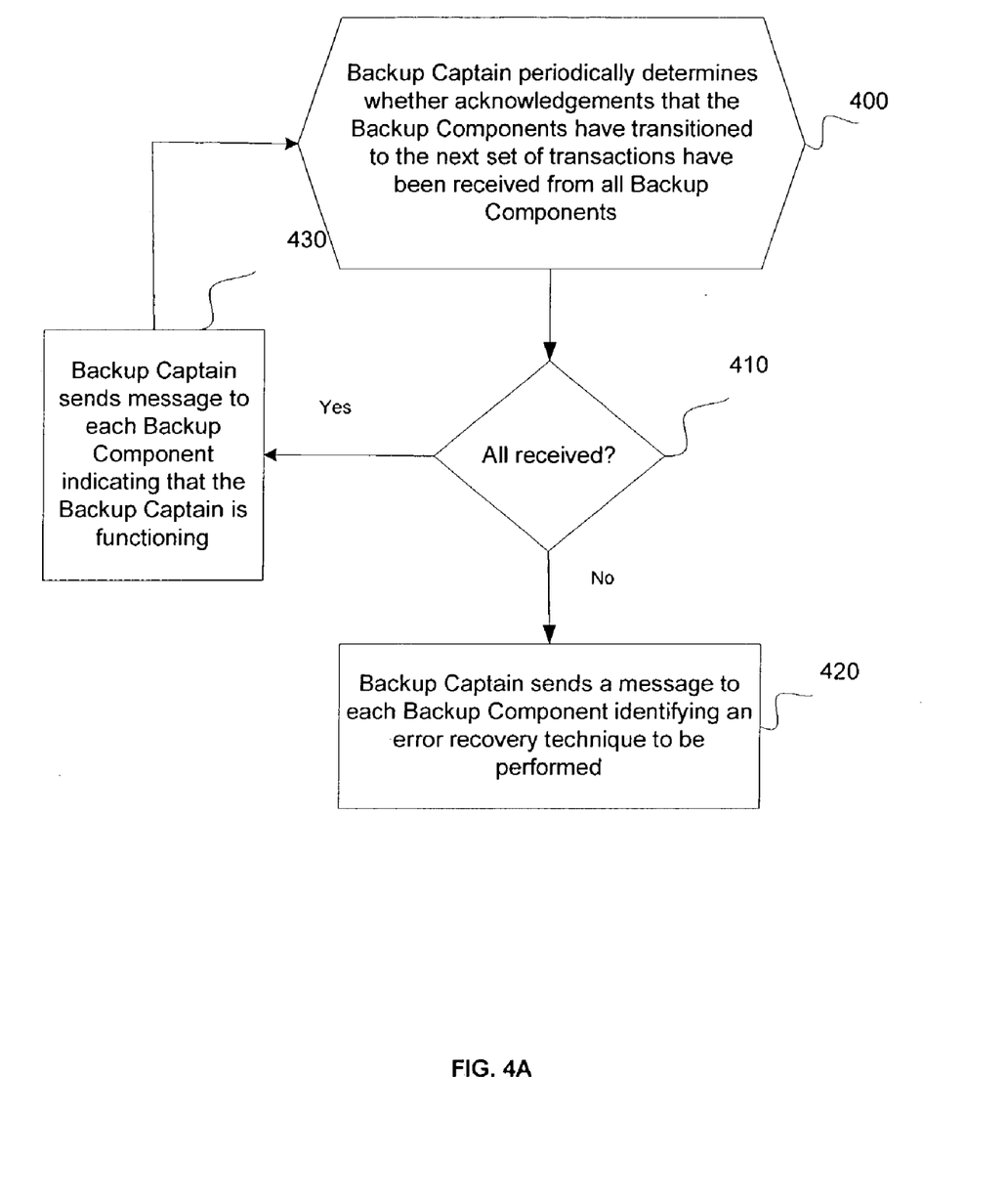
FIGS. 4A and 4B illustrate logic implemented in the backup captain in accordance with some implementations.
Figure 4B:
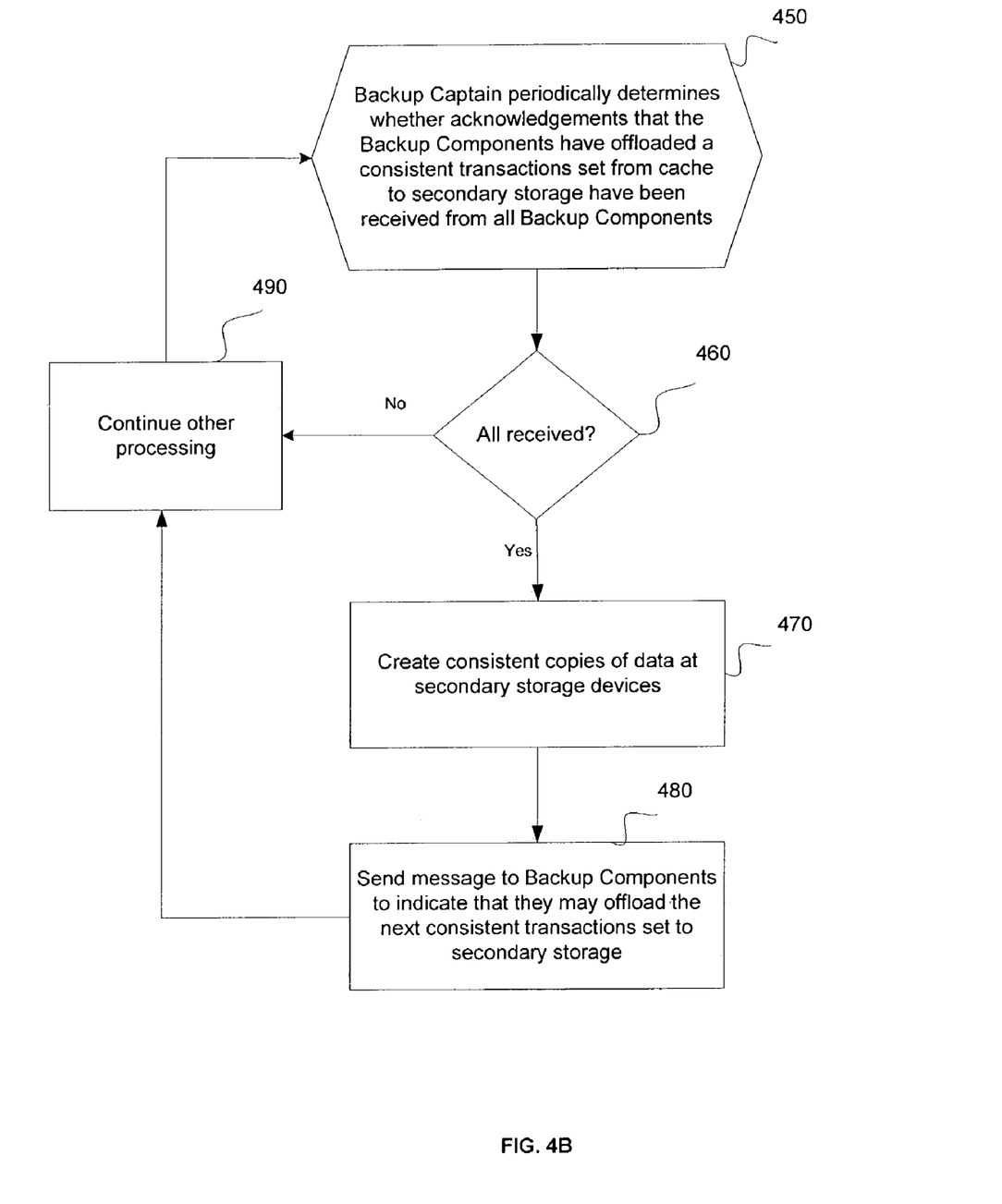

FIGS. 4A and 4B illustrate logic implemented in the backup captain in accordance with some implementations. In FIG. 4A, control begins at block 400 with the backup captain A 100 periodically determining whether acknowledgments that the backup components A 100, B 102, and C 104 have transitioned to a next set of transactions have been received from all backup components A 100, B 102, and C 104. In particular, the backup captain A 100 is responsible for monitoring successful processing of consistent transactions sets by the backup components A 100, B 102, and C 104 and handling error detection and recovery. The backup captain A 100 determines at the intervals set by the negotiated frequency of creating consistency copies (e.g., hourly) whether all backup components A 100, B 102, and C 104 have successfully processed one set of transactions and transitioned to processing a new set of transactions. In block 410, if all acknowledgments have been received, processing continues to block 430, otherwise processing continues to block 420.

In certain implementations, if all the backup components A 100, B 102, and C 104 complete successfully, the backup captain A 100 may send an acknowledgment back to each backup component A 100, B 102, and C 104 to continue processing. In certain implementations, a more efficient technique is to have the backup captain A 100 communicating with the backup components A 100, B 102, and C 104 only if an error has occurred, causing one or more of the backup components A 100, B 102, and C 104 not to inform the backup captain A 100 of proper transition. When the backup captain A 100 detects an error, the backup captain A 100 sends a message to each backup component A 100, B 102, and C 104 identifying an error recovery technique to be performed (420). In certain implementations, the backup captain A 100 tells each backup component A 100, B 102, and C 104 to go back to the previous consistent transactions set (e.g., add all new inbound transactions to the previous consistent transactions set) for all data received. Then, at the next interval for creating consistent transactions sets, the backup components A 100, B 102, and C 104 complete processing of a current set of transactions and transition to processing the next set of transactions. In certain implementations, more complex error recovery techniques may be used.

The backup captain A 100 periodically sends a message (i.e., a "heartbeat") to each backup component A 100, B 102, and C 104 to inform each backup component A 100, B 102, and C 104 that the backup captain A 100 is functioning (block 430). Although FIG. 4A illustrates the backup captain A 100 sending the message (i.e., the heartbeat) after determining that acknowledgments were received from each backup component A 100, B 102, and C 104, the message (i.e., heartbeat) may be sent at any periodic interval. As long as each backup component A 100, B 102, and C 104 receives the periodic message from the backup captain A 100 and does not receive an error recovery message, each backup component A 100, B 102, and C 104 continues processing data and repeats the consistent transactions set formation at the next scheduled interval.

If the backup components B 102 and C 104 do not receive a message from the backup captain A 100, the backup components B 102 and C 104 may raise an error (e.g., send an error message to an administrator) or negotiate for selection of a new backup captain.

In FIG. 4B, control begins at block 450 with the backup captain A 100 periodically determining whether acknowledgments that the backup components A 100, B 102, and C 104 have offloaded a consistent transactions set from cache to secondary storage have been received from all backup components A 100, B 102, and C 104. In block 460, the backup captain A 100 determines whether all acknowledgments have been received. If so, processing continues to block 470, otherwise processing continues to block 490. In block 470, the backup captain A 100 creates consistent copies of data at the secondary storage devices 120, 140, and 160. In block 480, the backup captain A 100 sends a message to the backup components A 100, B 102, and C 104 to indicate that the backup components A 100, B 102, and C 104 may offload the next consistent transactions set to secondary storage.

Implementations of the invention provide a method, system, and article of manufacture for maintaining data integrity across different storage devices. Implementations of the invention are particularly useful for mass storage spaces comprised of volumes spread across numerous storage systems. With implementations of the invention, backup components perform processing autonomously, and consistent copies of data are made at a secondary site for use in disaster recovery at a recovery site.

Unlike other solutions, implementations of the invention are autonomous. For example, certain solutions rely on one computer sending a message to other computers to tell them to stop processing, receiving an acknowledgment from each computer, and then sending a message to tell each computer to continue processing. Certain implementations of the invention do not require the backup captain and backup components to send messages to each other unless there is an error in normal processing. The invention is more efficient since some of the messages are eliminated. Instead, heart beating and timing synchronization communications are used. Additionally, heart beating and timing synchronization communications do not occur during the critical section of the consistent transactions set creation duration, thus reducing the time that the backup components must suspend processing.

This disclosure describes a time-synchronized, autonomous technique for achieving synchronization across all backup components while also limiting the amount of time required and the number of data transfers across common interfaces.

XRC, PPRC, and ESCON are trademarks of International Business Machines, Inc. of Armonk, N.Y.

ADDITIONAL IMPLEMENTATION DETAILS

The above described implementations for creating consistent copies may be implemented using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the implementations of FIGS. 1A and 1B, the primary control units and secondary control units may be server computers, while the backup components may be personal computers, workstations or other devices for transferring data. Although DASD storage devices are illustrated, any type of storage device may be used. The hosts may be any type of computer, appliance, handheld device, or tool for interacting with the primary control units.

Implementations of the primary control units and secondary control units described herein may be implemented in a mainframe operating system, such as the IBM S/390 system.

The described implementations may apply to database or non-database environments. For instance, the storage devices (e.g., DASD) may store databases, each of which may comprise any type of database used by any type of client application that accesses and manipulates the databases directly over a network without having the transactions executed by database servers.

The logic of FIGS. 2–4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic for maintaining consistency may be applied to the IBM XRC® computing environment, IBM PPRC® environment, or could be applied to maintain consistency in other environments.

In alternative implementations, the data being for which consistency is maintained may include data other than data to be moved between different sites or storage areas for back-up purposes.

The logic of FIGS. 2–4 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

In certain implementations, the selection of a backup captain is performed by a user or administrator. For example, the user or administrator selects one backup component A 100, B 102, or C 104 when configuring the backup components to backup messages from the primary control units A 110, B 130, and C 150 to the secondary control units A 116, B 136, and C 156. In certain implementations, the selection of the backup captain is performed by the backup components A 100, B 102, and C 104 by, for example, randomly selecting one backup component to be a backup captain. In certain implementations, the selection of the backup captain is performed by the backup components A 100, B 102, and C 104 by, for example, selecting one backup component (e.g., A 100) as backup captain, and cyclically selecting each other backup component (e.g., B 102 and C 104) at some time interval (e.g., on each succeeding day, which would lead to selection of backup component A 100 on the fourth day again).

In certain implementations, the frequency of creating consistent transactions sets is set by a user or administrator. Alternatively, the frequency of creating consistent transactions sets may be preset so that the backup components A 100, B 102, and C 104 are automatically aware of the frequency at initialization.

In certain implementations, the backup components A 100, B 102, and C 104 may also send a "heartbeat" message to the backup captain A 100 periodically.

In certain implementations, the frequency of creating consistent copies, the consistent transactions set creation duration, and/or the selection of a backup captain may be renegotiated at any time or periodically.

Figure 5:
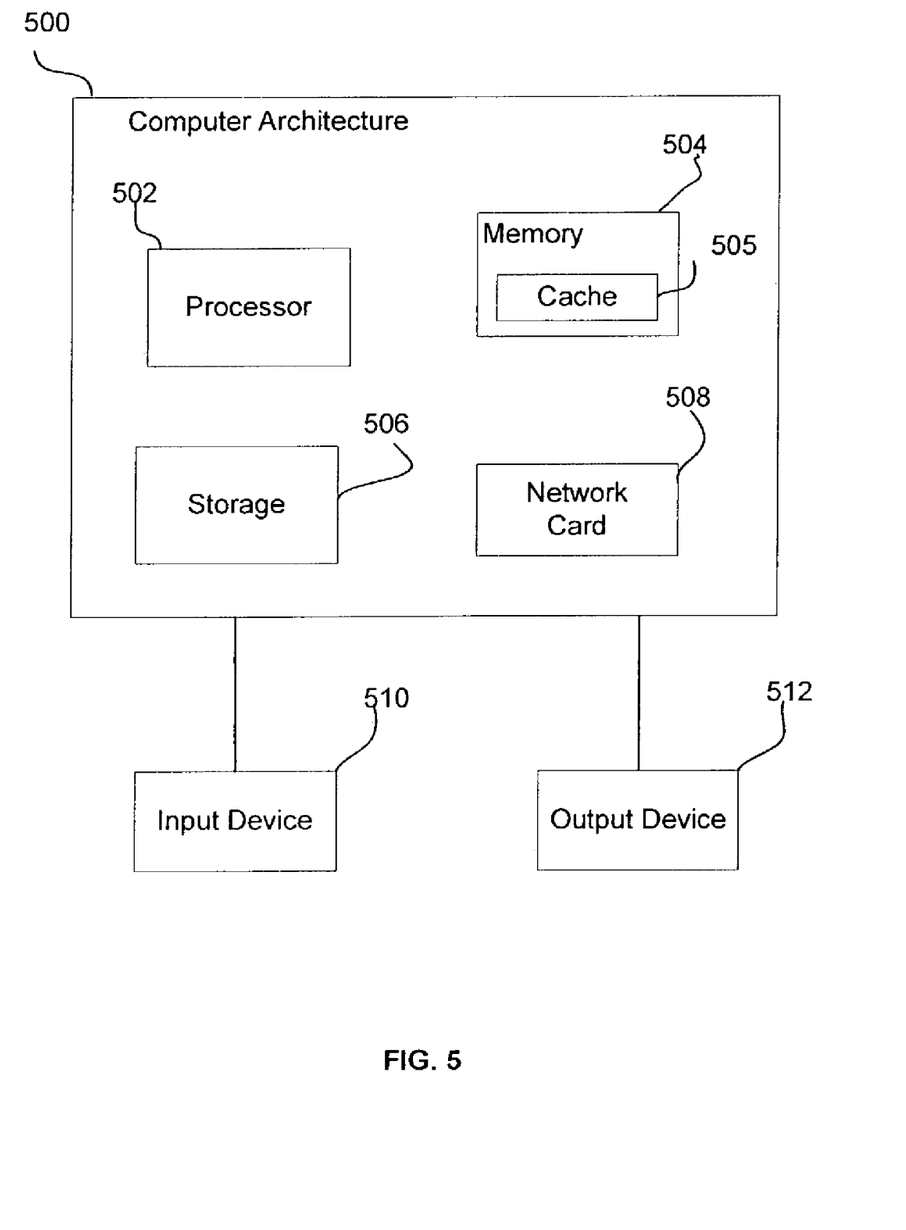
FIG. 5 illustrates an architecture of backup components in accordance with some implementations.

FIG. 5 illustrates an architecture of backup components A 100, B 102, and C 104 in accordance with some implementations. The backup components A 100, B 102, and C 104 may implement a computer architecture 500 having a processor 502 (e.g., a microprocessor), a memory 504 (e.g., a volatile memory device) having a cache 505, and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc. Primary control units A 110, B 130, and C 150 and secondary control units A 116, B 136, and C 156 may also be implemented with the architecture illustrated in FIG. 5.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for maintaining data integrity, comprising:
   negotiating a frequency for creating consistent transactions sets;
   negotiating a consistent transactions set creation duration; and
   at an interval determined by the frequency, during the consistent transactions set creation duration, completing processing of a first consistent transactions set and delaying processing of a second consistent transactions set until the end of the consistent transactions set creation duration.

2. The method of claim 1, wherein negotiation of the frequency enables autonomic creation of consistent transactions sets at multiple backup components.

3. The method of claim 1, wherein completing processing of a first consistent transactions set comprises caching the first consistent transactions set.

4. The method of claim 3, further comprising:
   forwarding the cached first consistent transactions set to a secondary storage device.

5. The method of claim 4, further comprising:
   creating a consistent copy at the secondary storage device.

6. The method of claim 1, wherein the frequency is set by a user.

7. The method of claim 1, wherein the frequency is set by an administrator.

8. The method of claim 1, wherein the consistent transactions set creation duration is a function of jitter time.

9. The method of claim 8, wherein jitter time is a measure of synchronization error and internal oscillator drift among a cluster of components.

10. The method of claim 9, wherein synchronization is maintained among the cluster of time synchronized components using a Network Time Protocol technique.

11. The method of claim 1, further comprising:
negotiating selection of a backup captain in a cluster of components.

12. The method of claim 1, further comprising:
during the consistent transactions set creation duration, sending a message from a backup component to a backup captain to acknowledge transition from the first consistent transactions set to the second consistent transactions set.

13. The method of claim 1, further comprising:
after all backup components have offloaded the first consistent transactions set to one or more secondary storage devices, creating one or more consistent copies of data at the one or more secondary storage devices, wherein each consistent copy is consistent for a consistent transactions set.

14. The method of claim 13, further comprising:
at a backup captain,
receiving notifications from each backup component that the backup component has offloaded the first consistent transactions set; and
initiating creation of the one or more consistent copies.

15. The method of claim 14, further comprising:
transmitting from the backup captain to each backup component a notification that the backup component may offload the second consistent transactions set.

16. The method of claim 1, further comprising:
after the consistent transactions set creation duration, processing the second consistent transactions set.

17. The method of claim 1, further comprising:
determining whether all backup components have completed processing the first consistent transactions set and are ready to process the second consistent transactions set; and
if not all of the backup components have completed processing the first consistent transactions set, sending a message from a backup captain to each of the backup components identifying an error recovery technique to be performed by each of the backup components.

18. The method of claim 1, further comprising:
sending a message to each backup component from a backup captain to indicate that the backup captain is functioning.

19. The method of claim 1, wherein each consistent transactions set is associated with an identifier.

20. A system for maintaining data integrity, comprising:
a set of backup components; and
a computer program executable at each backup component, wherein the computer program comprises instructions executable at each backup component for:
negotiating a frequency for creating consistent transactions sets;
negotiating a consistent transactions set creation duration; and
at an interval determined by the frequency, during the consistent transactions set creation duration, completing processing of a first consistent transactions set and delaying processing of a second consistent transactions set until the end of the consistent transactions set creation duration.

21. The system of claim 20, wherein negotiation of the frequency enables autonomic creation of consistent transactions sets at multiple backup components.

22. The system of claim 20, wherein completing processing of a first consistent transactions set comprises caching the first consistent transactions set.

23. The system of claim 22, wherein the computer program further comprises instructions for:
forwarding the cached first consistent transactions set to a secondary storage device.

24. The system of claim 23, wherein the computer program further comprises instructions for:
creating a consistent copy at the secondary storage device.

25. The system of claim 20, wherein the frequency is set by a user.

26. The system of claim 20, wherein the frequency is set by an administrator.

27. The system of claim 20, wherein the consistent transactions set creation duration is a function of jitter time.

28. The system of claim 27, wherein jitter time is a measure of synchronization error and internal oscillator drift among a cluster of components.

29. The system of claim 28, wherein synchronization is maintained among the cluster of time synchronized components using a Network Time Protocol technique.

30. The system of claim 20, wherein the computer program further comprises instructions for:
negotiating selection of a backup captain in a cluster of components.

31. The system of claim 20, wherein one of the backup components is a backup captain and wherein the computer program further comprises instructions for:
during the consistent transactions set creation duration, sending a message from a component to the backup captain to acknowledge transition from the first consistent transactions set to the second consistent transactions set.

32. The system of claim 20, wherein the computer program further comprises instructions for:
after all backup components have offloaded the first consistent transactions set to one or more secondary storage devices, creating one or more consistent copies of data at the one or more secondary storage devices, wherein each consistent copy is consistent for a consistent transactions set.

33. The system of claim 32, wherein the computer program further comprises instructions for:
at a backup captain,
receiving notifications from each backup component that the backup component has offloaded the first consistent transactions set; and
initiating creation of the one or more consistent copies.

34. The system of claim 33, wherein the computer program further comprises instructions for:
transmitting from the backup captain to each backup component a notification that the backup component may offload the second consistent transactions set.

35. The system of claim 20, wherein the computer program further comprises instructions for:
after the consistent transactions set creation duration, processing the second consistent transactions set.

36. The system of claim 20, wherein the computer program further comprises instructions for:
determining whether all backup components have completed processing the first consistent transactions set and are ready to process the second consistent transactions set; and if not all of the backup components have completed processing the first consistent transactions set, sending a message from a backup captain to each of the backup components identifying an error recovery technique to be performed by each of the backup components.

37. The system of claim 20, wherein execution of the instructions further comprises:
sending a message to each backup component from a backup captain to indicate that the backup captain is functioning.

38. The system of claim 20, wherein each consistent transactions set is associated with an identifier.

39. An article of manufacture including code for maintaining data integrity, wherein the code is capable of causing operations, the operations comprising:
negotiating a frequency for creating consistent transactions sets;
negotiating a consistent transactions set creation duration; and
at an interval determined by the frequency, during the consistent transactions set creation duration, completing processing of a first consistent transactions set and delaying processing of a second consistent transactions set until the end of the consistent transactions set creation duration.

40. The article of manufacture of claim 39, wherein negotiation of the frequency enables autonomic creation of consistent transactions sets at multiple backup components.

41. The article of manufacture of claim 39, wherein completing processing of a first consistent transactions set comprises caching the first consistent transactions set.

42. The article of manufacture of claim 41, the operations further comprising:
forwarding the cached first consistent transactions set to a secondary storage device.

43. The article of manufacture of claim 42, the operations further comprising:
creating a consistent copy at the secondary storage device.

44. The article of manufacture of claim 39, wherein the frequency is set by a user.

45. The article of manufacture of claim 39, wherein the frequency is set by an administrator.

46. The article of manufacture of claim 39, wherein the consistent transactions set creation duration is a function of jitter time.

47. The article of manufacture of claim 46, wherein jitter time is a measure of synchronization error and internal oscillator drift among a cluster of components.

48. The article of manufacture of claim 47, wherein synchronization is maintained among the cluster of time synchronized components using a Network Time Protocol technique.

49. The article of manufacture of claim 39, the operations further comprising:
negotiating selection of a backup captain in a cluster of components.

50. The article of manufacture of claim 39, the operations further comprising:
during the consistent transactions set creation duration, sending a message from a backup component to a backup captain to acknowledge transition from the first consistent transactions set to the second consistent transactions set.

51. The article of manufacture of claim 39, the operations further comprising:
after all backup components have offloaded the first consistent transactions set to one or more secondary storage devices, creating one or more consistent copies of data at the one or more secondary storage devices, wherein each consistent copy is consistent for a consistent transactions set.

52. The article of manufacture of claim 51, the operations further comprising:
at a backup captain,
receiving notifications from each backup component that the backup component has offloaded the first consistent transactions set; and
initiating creation of the one or more consistent copies.

53. The article of manufacture of claim 52, the operations further comprising:
transmitting from the backup captain to each backup component a notification that the backup component may offload the second consistent transactions set.

54. The article of manufacture of claim 39, further comprising:
after the consistent transactions set creation duration, processing the second consistent transactions set.

55. The article of manufacture of claim 39, further comprising:
determining whether all backup components have completed processing the first consistent transactions set and are ready to process the second consistent transactions set; and
if not all of the backup components have completed processing the first consistent transactions set, sending a message from a backup captain to each of the backup components identifying an error recovery technique to be performed by each of the backup components.

56. The article of manufacture of claim 39, further comprising:
sending a message to each backup component from a backup captain to indicate that the backup captain is functioning.

57. The article of manufacture of claim 39, wherein each consistent transactions set is associated with an identifier.

58. A system for maintaining data integrity, comprising:
a component;
a primary storage device; and
means for negotiating a frequency for creating consistent transactions sets;
means for negotiating a consistent transactions set creation duration; and
means for, at an interval determined by the frequency, during the consistent transactions set creation duration, completing processing of a first consistent transactions set received from the primary storage device and delaying processing of a second consistent transactions set until the end of the consistent transactions set creation duration.

* * * * *